(12) United States Patent
Nakabayashi

(10) Patent No.: US 6,908,575 B2
(45) Date of Patent: Jun. 21, 2005

(54) MOLD RELEASING METHOD AND APPARATUS FOR DIFFRACTION OPTICAL ELEMENT

(75) Inventor: Masaaki Nakabayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 234 days.

(21) Appl. No.: 10/187,341

(22) Filed: Jul. 2, 2002

(65) Prior Publication Data

US 2003/0025223 A1 Feb. 6, 2003

(30) Foreign Application Priority Data

Jul. 4, 2001 (JP) .................................... 2001-203770

(51) Int. Cl.$^7$ .............................................. B29D 11/00
(52) U.S. Cl. ................... 264/1.1; 264/334; 425/436 R; 425/808
(58) Field of Search .......................... 264/1.1, 1.7, 2.6, 264/2.5, 334; 425/808, 436 R, 436 RM, 444

(56) References Cited

U.S. PATENT DOCUMENTS 5,340,528 A * 8/1994 Machida et al. .......... 264/328.7
6,033,603 A * 3/2000 Lesczynski et al. .......... 264/1.1
6,070,436 A * 6/2000 Hirota et al. .................. 65/64

FOREIGN PATENT DOCUMENTS

JP  3-79314  4/1991

OTHER PUBLICATIONS

M.W. Farn, et al., "Diffractive Doublet Corrected On–Axis at Two Wavelengths," *Proceedings of the SPIE: International Lens Design Conference*, vol. 1354, Jun. 11–14, 1990, pp. 24–29.

C. Londoño, et al., "The Design of Achromatized Hybrid Diffractive Lens Systems," *Proceedings of the SPIE: International Lens Design Conference*, vol. 1354, Jun. 11–14, 1990, pp. 30–37.

* cited by examiner

*Primary Examiner*—Mathieu D. Vargot
(74) *Attorney, Agent, or Firm*—Fitzpatrick, Cella, Harper & Scinto

(57) ABSTRACT

The object of this invention is to provide a mold releasing method for a diffraction optical element, which enables stable mass production of a diffraction optical element free from deformation or damage due to mold release. In order to achieve this object, a mold releasing method for a diffraction optical element, of releasing from a mold a diffraction optical element formed by using the mold and having a convex lens function, includes the steps of pressing a central portion of the diffraction optical element toward the mold, and pushing a periphery of the diffraction optical element in a direction to separate from the mold, so that mold release progresses from the periphery toward the central portion of the diffraction optical element. The method also includes the step of adjusting the balance with a plurality of hydraulic cylinders without pressing the central portion, so that mold release progresses toward the center.

6 Claims, 6 Drawing Sheets

FIG. 2
CONVEX LENS TYPE
CONCAVE LENS TYPE

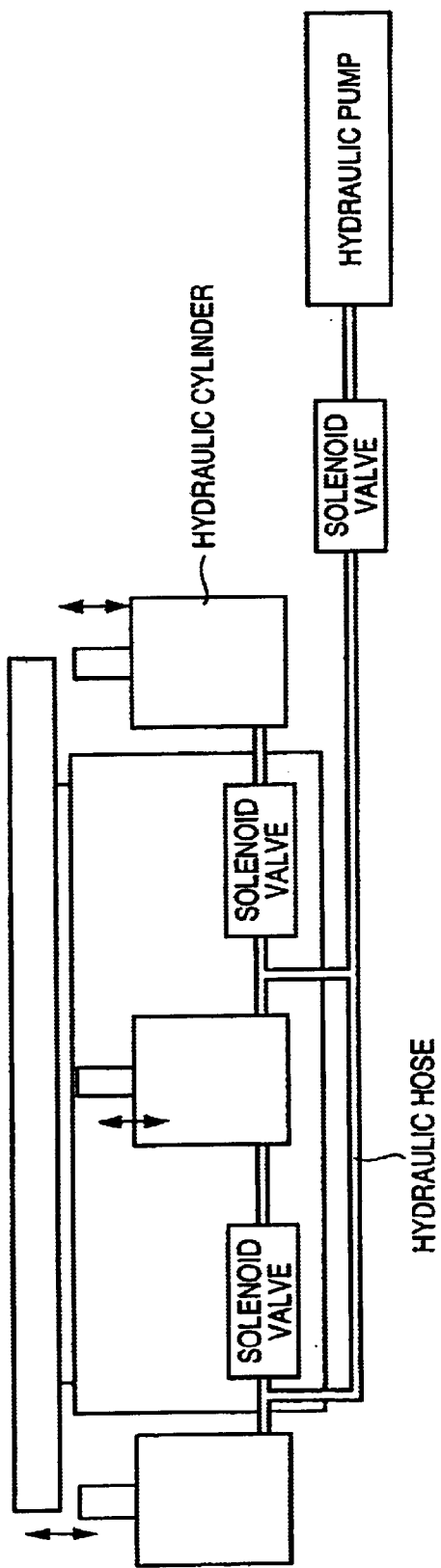

MOLD RELEASING METHOD AND APPARATUS FOR DIFFRACTION OPTICAL ELEMENT

FIELD OF THE INVENTION

The present invention relates to a mold releasing method and apparatus for a multilayered diffraction optical element formed by molding and having such a grating structure that light beams of a wavelength band to be used are concentrated at a specific order.

BACKGROUND OF THE INVENTION

Conventionally, the chromatic aberration of an optical system has been corrected by combining optical elements made of glass materials with different dispersions. Use of a diffraction type optical system but not a refraction type optical system (lens) is disclosed in SPIE Vol. 1354, Pages 24 to 37.

When a diffraction surface with a diffraction efficiency is to be added to an optical system with spectroscopic characteristics, it is important to maintain high a diffraction efficiency in the wavelength band to be used. Regarding light of an order other than the designed order, the farther the order from the designed order, the larger the diffraction angle, and the larger the difference in focal length, which appears as defocus. When a particularly high-brightness light source is present, this defocus may sometimes be observed as a side lobe.

In an optical system having a chromatic aberration correcting effect, a diffraction optical element with a multilayered structure (obtained by stacking a convex lens type diffraction element and a concave lens type diffraction element) greatly improves a diffraction efficiency in the vicinity of a designed order within the band of a wavelength to be used. When this diffraction optical element is applied, a considerably large improvement can be expected in the image quality and information quality. Although the optical performance is improved as described above, when the conventional method is used, the manufacturing method becomes very complicated and very expensive, and is thus difficult to put into a practical use, as will be described hereinafter.

More specifically, regarding a method of realizing a diffraction optical element having a multilayered structure of two layers or more, photolithography as a semiconductor manufacturing process or a precision cutting technique by means of a diamond cutting tool is conventionally known as a typical micropatterning technique. Using a micropatterned shape formed by this processing technique as a mold, a plastic or glass can be molded, thereby manufacturing a diffraction optical element.

To achieve the above diffraction optical element with the multilayered structure, the diffraction gratings themselves to be stacked must be fabricated with high precision.

Conventionally, as a technique for manufacturing a duplicate of an optical element, a replica molding method using a photo-setting resin is preferred because of its transfer properties, surface precision, easiness, and the like. This method will be significant in the future as well because it can transfer a micropatterned shape obtained by photolithography. The transfer properties may be adversely affected by the setting shrinkage amount of the material itself, but various types of techniques have been proposed as this method. For example, Japanese Patent Laid-Open No. 3-79314 discloses a mold releasing technique. With a mold releasing method that causes turn-up when the depth of a micropattern becomes large, the following problems arise.

Since a multilayered diffraction optical element is obtained by literally bonding two diffraction optical elements, it must be thin in view of the weight or downsizing of the product. Conventionally, according to the replica molding method described above, the mold is released by pulling up a glass substrate larger than the mold diameter. During the progress of mold release, a very large warp (deformation) undesirably occurs in the entire element. For example, when a refractive index lens with a spherical or aspherical surface is to be molded, its molding shape may not be adversely affected by the replica molding method. In a diffraction optical element having a three-dimensional shape at a very small pitch on its surface, a mold release angle formed by warp or deformation serves as a force to cause the micropatterned molding shape to fall down, and deforms or damages it. The size of the warp is mainly determined by the adhesion properties between the material to be molded and the material of the mold. To decrease the adhesion properties, a mold release agent may be applied to the mold, but this is difficult when irregularity of the micropatterned shape and maintenance in mass production are considered.

SUMMARY OF THE INVENTION

The present invention has been made in view of the problems described above, and has as its object to provide a mold releasing method and apparatus for a diffraction optical element which enable stable mass production of a diffraction optical element free from deformation or damage caused by mold release.

The damage in shape of a diffraction optical element largely depends on the mold shape to be transferred and the releasing direction with respect to the mold shape. In a diffraction grating corresponding to a convex type lens, mold release can be achieved with no defects if it progresses toward the center.

In order to achieve the above object, a mold releasing method for a diffraction optical element according to the present invention is characterized in the following steps.

More specifically, a mold releasing method for a diffraction optical element, of releasing from a mold a diffraction optical element formed by using the mold and having a convex lens function, is characterized by comprising the steps of pressing a central portion of the diffraction optical element toward the mold, and pushing a periphery of the diffraction optical element in a direction to separate from the mold, so that mold release progresses from the periphery toward the central portion of the diffraction optical element.

A mold releasing apparatus for a diffraction optical element according to the present invention is characterized in the following arrangement.

More specifically, a mold releasing apparatus for a diffraction optical element, for releasing from a mold a diffraction optical element formed by using the mold and having a convex lens function, comprises pressing means for pressing a central portion of the diffraction optical element toward the mold, and mold releasing means for pushing a periphery of the diffraction optical element in a direction to separate from the mold, so that mold release progresses from the periphery toward the central portion of the diffraction optical element. The balance is controlled with hydraulic cylinders without pressing the center of the diffraction optical element, so that mold release progresses toward the central portion.

Other features and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 2 is a view showing convex and concave lens type diffraction lenses;

FIG. 6 is a view showing a mold releasing apparatus according to the second embodiment of the present invention.

DETAILED DESCRIPTION OF THE PREFERRED EMBODIMENTS

The preferred embodiments of the present invention will be described in detail with reference to the accompanying drawings.

(First Embodiment)

Figure 1:
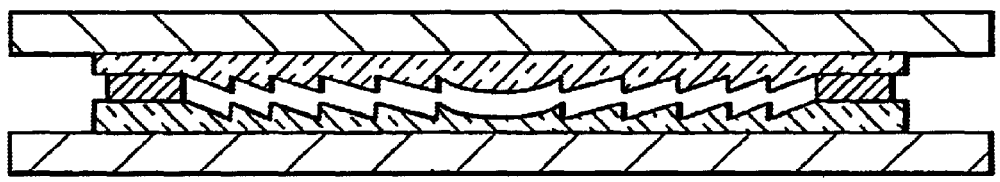
FIG. 1 is a sectional side view showing the structure of a multilayered diffraction optical element according to the embodiment of the present invention.

A multilayered diffraction optical element according to this embodiment can be formed by bonding concave and convex lens type diffraction optical lenses, as shown in FIG. 1. As shown in FIG. 2, when the diffraction optical lens has a blazed grating, the concave lens type diffraction optical lens has its grating vertex on its peripheral side, while the convex lens type diffraction optical lens has its grating vertex on its central side.

Figure 3:
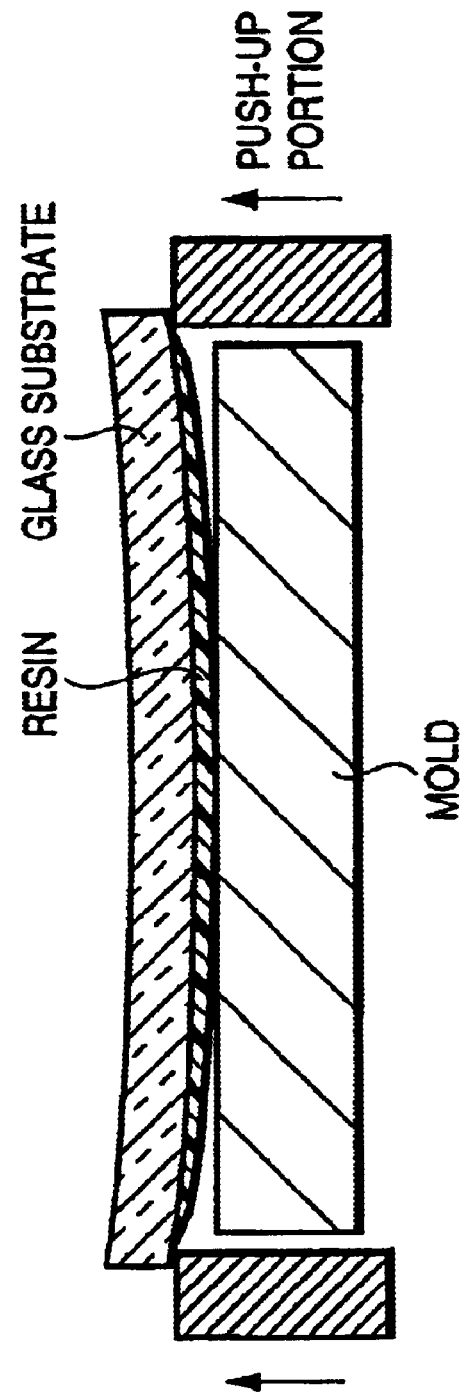
FIG. 3 is a view showing a conventional mold release state in a replica molding method.

According to the replica molding method, (1) a photo-setting resin is dropped onto a mold and a glass substrate is placed on the mold. When the resin spreads over the entire mold to reach a desired resin thickness, (2) the resin is irradiated with ultraviolet rays in order to set the resin, and (3) finally, a shape-transferred molded product is released together with the glass substrate. FIG. 3 shows how to release the resin molded product of (3) from the mold in the conventional manner.

Figure 4:
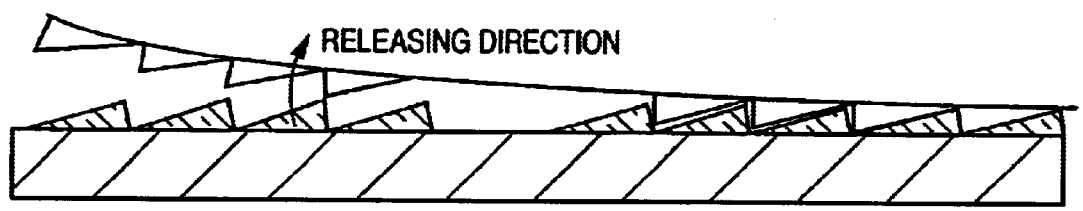
FIG. 4 is a view for explaining grating deformation occurring during mold release.

Assuming that the molded product is a convex lens type diffraction optical lens, that is, the mold is a concave type mold which is necessary for molding a convex lens type diffraction optical lens. In this case, in mold release of the molded product, when release progresses from the periphery toward the center, the grating of the molded resin separates from the mold without abutting against the grating shape of the mold during the releasing step. During the mold releasing step, if the balance of molding is poor and mold release undesirably progresses partly from the center to the periphery, as shown in FIG. 4, the grating of the molded resin abuts against the grating shape of the mold. Then, the grating shape of the molded product is considerably deformed or damaged. It is known that in a diffraction grating with a grating shape deformed or damaged in this manner, a decrease in diffraction efficiency and flare occur to largely adversely affect the image quality.

In order to obtain a nondefective convex type diffraction lens, according to the first embodiment, the following mechanism and steps are employed in mold release with the replica molding method described above.

Figure 5:
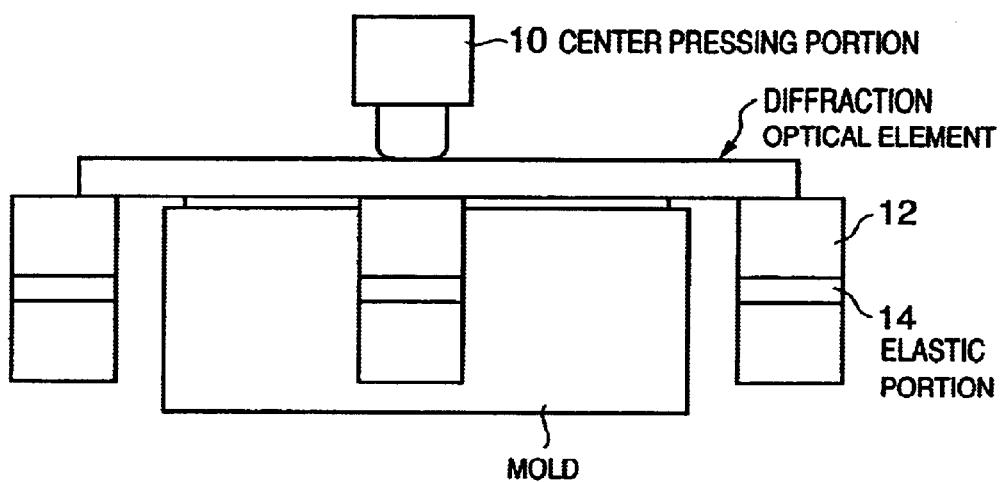
FIG. 5 is a view showing a mold releasing apparatus according to the first embodiment of the present invention.

Of the steps described above, before the process advances to step (3), the central portion of the element is pressed with a center pressing portion 10, as shown in FIG. 5. After that, an ejector 12 for pushing up the periphery of the molded product is pushed up to start mold release. At this time, the ejector 12 is sometimes inclined with respect to that portion of the molded product which is to be pushed up. Hence, an elastic portion 14 for absorbing the inclination is formed on the lower portion of the ejector 12. As the ejector 12 moves up, release progresses from the periphery toward the center of the element. When the load of the ejector 12 becomes equal to or larger than the specified value (determined by the element strength and the like), the pressing force of the center pressing portion 10 which presses the center of the upper portion of the element is gradually decreased, and release of the element is completed until the center.

(Second Embodiment)

The second embodiment is the same as the first embodiment until step (2).

A desired mold releasing method is difficult because part of the ejector strongly pushes the molded product due to a small inclination between the ejector and the molded product. According to the second embodiment, as shown in FIG. 6, a plurality of hydraulic cylinders are urged against the molded product, so the relative height of the ejector at the initial position is adjusted to match the molded product. Since the hydraulic cylinders are connected to each other through hoses, the self-balance among them is effected by moving up an inclination correcting cylinder mechanism, so the inclination can be corrected. The correction state is checked by detecting that the hydraulic pressure has reached a reference value equal to or lower than the release limit with the hydraulic sensors of the hydraulic cylinders. Then, the hydraulic pump is stopped. Solenoid valves connected to the hoses that connect the hydraulic cylinders to each other are closed so the individual hydraulic cylinders are fixed. The entire hydraulic cylinders are gradually moved up to release the mold.

As described above, according to the above embodiments, in the manufacture of a multilayered diffraction grating having such a grating structure that light beams of a wavelength band to be used are concentrated at a specific order, mass production becomes possible without spoiling the grating shapes of individual diffraction gratings that greatly influence the quality of the multilayered diffraction grating.

As has been described above, according to the above embodiments, stable mass production of a diffraction optical element free from deformation or damage due to mold release is enabled.

The present invention is not limited to the above embodiments and various changes and modifications can be made within the spirit and scope of the present invention. Therefore, to apprise the public of the scope of the present invention the following claims are made.

What is claimed is:

1. A mold releasing method for a diffraction optical element, of releasing from a mold a diffraction optical element formed by using the mold and having a convex lens function, which diffraction optical element has a grating vertex on its central side, said method comprising the steps of:

pressing a central portion of the diffraction optical element toward the mold with a predetermined force; and releasing the diffraction optical element from the mold by applying a force of an elector device to a periphery of the diffraction optical element so that a mold release progresses from the periphery toward the central portion of the diffraction optical element, wherein, in said releasing step, when the force of the ejector device becomes equal to or larger than a specified value, the predetermined force applied to the central portion of the diffraction optical element is gradually reduced.

2. The method according to claim 1, wherein the elector device for applying the force to the periphery of the diffraction optical element is supported by an elastic member.

3. The method according to claim 1, wherein the ejector device is moved by a plurality of hydraulic cylinders in a direction which the periphery of the diffraction optical element is separated from the mold.

4. A mold releasing apparatus for a diffraction optical element, for releasing from a mold a diffraction optical element formed by using the mold and having a convex lens function, which diffraction optical element has a grating vertex on its central side, said apparatus comprising:

pressing means for pressing a central portion of the diffraction optical element toward the mold with a predetermined force; and mold releasing means for applying a force to a periphery of the diffraction optical element in a direction to separate from the mold, so that mold release progresses from the periphery toward the central portion of the diffraction optical element, wherein when the force of said mold releasing means becomes equal to or larger than a specified value, the predetermined force applied to the central portion of the diffraction optical element is gradually reduced.

5. The apparatus according to claim 4, wherein said mold releasing means for applying the force to the periphery of the diffraction optical element is supported by an elastic member.

6. The apparatus according to claim 4, wherein said mold releasing means is moved by a plurality of hydraulic cylinders in a direction which the periphery of the diffraction optical element is separated from the mold.

* * * * *

UNITED STATES PATENT AND TRADEMARK OFFICE
CERTIFICATE OF CORRECTION

PATENT NO. : 6,908,575 B2
DATED : June 21, 2005
INVENTOR(S) : Masaaki Nakabayashi It is certified that error appears in the above-identified patent and that said Letters Patent is hereby corrected as shown below:

Column 5,
Lines 4 and 13, "elector" should read -- ejector --.

Signed and Sealed this

Twenty-fourth Day of January, 2006

JON W. DUDAS
*Director of the United States Patent and Trademark Office*